Dec. 24, 1935.  S. J. CARMODY  2,025,440
DUAL VALVE CONTROL MECHANISM
Filed Dec. 29, 1933
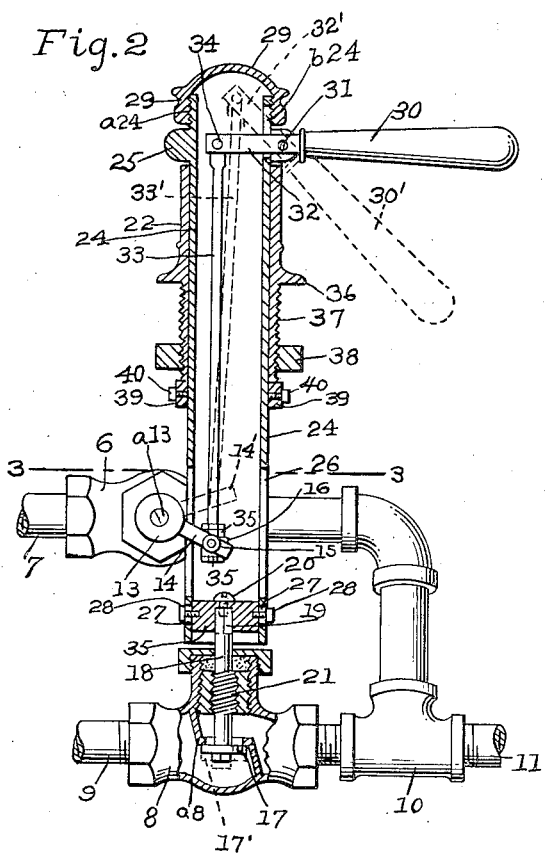
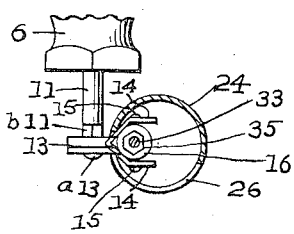
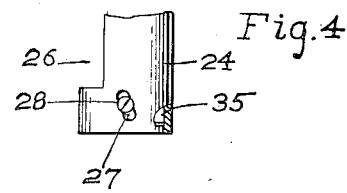
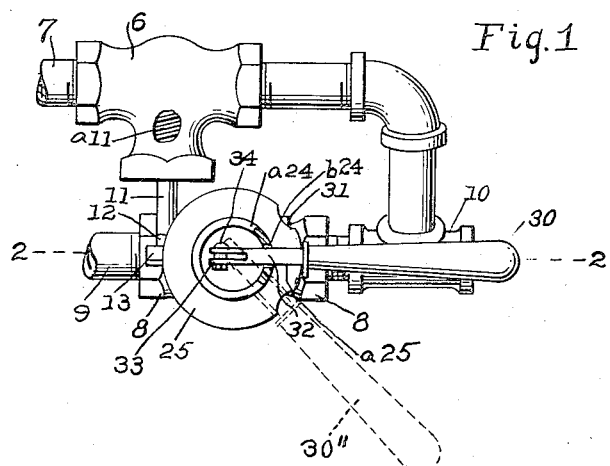
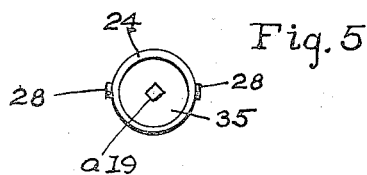
INVENTOR,
Stephen J. Carmody.
BY David E. Lain,
ATTORNEY.

Patented Dec. 24, 1935

2,025,440

UNITED STATES PATENT OFFICE 2,025,440

DUAL VALVE CONTROL MECHANISM

Stephen J. Carmody, Bellingham, Wash.

Application December 29, 1933, Serial No. 704,439

1 Claim. (Cl. 277—10)

My invention relates to improvements in dual valve-control mechanisms, more especially as applied to the use of line valves for controlling supplies of cold, hot and warm water and, when thus applied, has for an object to control the flow of water from cold and hot water valves, having a joint outlet, by one handle; whereby the cold water valve may be operated separately, the hot water valve may be separately operated and both of the valves may be operated simultaneously while being controlled separately. Another object of my improvement is to provide the said valve-control mechanism as an individual assembly, apart from the valves to be operated thereby, which may be sold to the trade as such for use with line valves of standard types.

Another object of my improvement is to provide the said mechanism suitably for mounting in one of the standard bib cock openings in a wash bowl while the other usual opening in the bowl is occupied by a joint outlet spout.

Another object of my improvement is to simplify the construction of the said mechanism suitably for quantity production.

Other objects of my improvement will appear as the description proceeds.

For the purposes of this specification a line valve is one which is suitable for including in a line of pipes and the housing ends of which are adapted for engagement with pipes.

I attain these and other objects of my improvement with the mechanism illustrated in the accompanying sheet of drawing, forming a part of this specification, in which Figure 1 is a plan view of my dual valve-control mechanism operatively connected with two line valves of the screw-operated, pressure type engaged with separate inlet and joint outlet pipes, Fig. 2 is a front elevation of Fig. 1 in section on the line 2—2 thereof, Fig. 3 is a cross-section of Fig. 2 on the line 3—3 thereof, Fig. 4 is a view of a fragmentary portion of Fig. 2 rotated through an angle of 90°, and Fig. 5 is a segregated bottom end view of the hollow shaft.

Similar characters refer to similar parts throughout. Certain parts are broken away to show other parts hidden thereby.

With more particular reference to the designated parts: The cold water valve 6 is connected with a source of cold water under pressure by the pipe 7, the source of the water not being shown, and is of the pressure type having the valve stem 11 and the screw a11 thereon. The hot water valve 8 is connected with a source of hot water under pressure by the pipe 9, the source of the hot water not being shown, and is of the pressure type having the valve stem 18, the screw 21 thereon, the valve 17 fastened on the lower end of the valve stem on the pressure side of the valve seat a8, and the usual square outer end 19 on the valve stem. The valve stem 11 has the usual squared outer end 12 and the valve 6 is like the valve 8 in every particular.

The crank arm shank 13 has a central square hole through which the squared end 12 of the valve stem 11 is extended and retained in engagement with the shank by the stem screw a13.

The bifurcated crank arm 14, 14 is fastened to the shank 13 and pivotally engaged with the trunnion disc 16 by the trunnion screws 15, 15 extended through aligned holes in the arms 14 and engaged in tapped holes in the disc, providing for the oscillation of the crank arms on the trunnion disc screws 15.

The bearing standard 22 has the foot flange 36 to bear on a wash bowl, and the threaded end 37 to be extended through an opening in the wash bowl and clamped thereto by the nut 38 thereon.

The hollow shaft 24 is mounted for rotation in the bearing standard 22 and is retained from reciprocation therein by the boss 25 on the shaft near its upper end, to bear on the upper end of the standard, and by the set ring 39, retained on the shaft by the set screws 40, 40 to bear on the bottom end of the threaded end 37 of the standard. The hollow shaft has a slot b24 through the boss 25 and through the walls of the shaft adjacent its upper end. The upper end of the hollow shaft 24 is threaded and covered by the screw cap 29 engaged thereon. The hollow shaft has an opening through its walls at 26 through which the bifurcated crank arm 14 is extended, disposing the trunnion disc 16 entirely within the hollow shaft. The opening 26 is wide enough to provide for the limited rotation of the shaft relative to the crank arm.

The control handle 30 has the shank 32 which is extended through the shaft opening b24 and the handle is mounted for oscillation in a plane through the axis of rotation of the shaft on the pin 31 extended through aligned holes in the boss 25 and the shank 32.

On the inner end of the shank 32 is pivoted the upper end of the rod 33 at 34 within the shaft 24. The lower end of the rod 33 is extended through a central opening in the trunnion disc 16 for rotation therein and is engaged with the disc by the set nuts 35, 35 on the threaded lower end of the rod and disposed on both sides of the disc. The construction provides for oscillating the crank arm 14 by the handle shank 32 while the hollow shaft 24 is rotated in the bearing 22, requiring for the rod 33 freedom to rotate in the trunnion disc 16 and for the crank arms 14 freedom to oscillate on the trunnion disc. The oscillation of the handle shank 32 is provided by oscillating the handle 30 in the plane of the axis of rotation of the shaft 24 on the pin 31, and the rotation of the shaft 24 is provided by oscillating the handle 30 with the hollow shaft on the axis of rotation thereof.

The disc 35 has the square central hole $a19$ through which the squared end 19 of the valve stem 18 is extended for engagement with the disc and the stem is retained in engagement with the disc by the stem screw 20. The disc 35, while thus engaged with the valve stem 18, is extended into the bottom end of the hollow shaft 24 and engaged therewith for limited oscillation therein by the screws 28 which are extended through the slots 27, 27 in the shaft and engaged in tapped holes in the disc. The construction provides for the rotation of the valve stem 18 by the shaft 24 while allowing for the reciprocation of the disc in the shaft required by the reciprocation of the valve stem as the screw 21 thereon revolves in the threaded interior of the valve housing wherein it is engaged. This particular construction, illustrated, easily could be replaced by equivalents, such as by using bosses on the disc to engage in deep notches in the shaft, or by providing for the reciprocation of the squared end of the valve stem in the square hole in the disc.

In operation: Assume that the standard 22 is installed in the right-hand bib-cock opening in a wash bowl, that pipe 7 is connected with a source of cold water under pressure, that pipe 9 is connected with a source of hot water under pressure, that pipe 11 is connected with an outlet spout installed in the left-hand bib-cock opening, that the solid line positions of the mechanism and valves pertain when the valves are fully closed and that the dotted-line positions of the same pertain when the valves are fully open.

When it is desired to have cold water flow from the outlet spout, not shown, handle 30 is moved toward its position at 30' till the desired flow of cold water comes from the spout. To stop the flow of cold water the handle is returned to its solid-line position.

When it is desired to have hot water flow from the spout, handle 30 is moved toward its dotted-line position at 30'' till the desired flow of hot water is attained. To stop the flow of hot water the handle is returned to its solid-line position.

When it is desired to have a flow of tepid water from the said spout, the handle 30 is moved diagonally downward toward the left till the desired temperature of water together with the desired quantity flow is attained. To stop the flow of tepid water the handle is returned to its full-line position.

As stated, the valves 6 and 8 selected for the illustration are of the pressure type. That is, the valve 17 is seated on the pressure side of the seat $a8$ and, when moved toward its open position at 17', it opens against the pressure of the water in pipe 9. However, if it is desired to substitute valves of the compression type, that is, those that are opened with the pressure of the water, the only change in the disclosed mechanism needed is to substitute opposite threads on the valve stems to those shown at $a11$ and 21.

One particular mechanical construction has been disclosed to attain the objectives of the improvement. There are other suitable constructions in detail which could be used with equal success, doubtless some of them better suited for the purpose, all of which are within the purview of my invention.

Having thus disclosed my invention, what I claim as new therein and desire to secure by Letters Patent is,—

A dual valve-control mechanism including, a rotatable hollow shaft having an opening through its walls at its upper end and an opening through its walls at its lower end, a bearing to mount the hollow shaft for rotation, means to connect the hollow shaft with the stem of a valve for operating the valve by said hollow shaft rotation, a handle pivoted to the hollow shaft for oscillation in the plane of the hollow shaft axis and for oscillating the hollow shaft on the axis thereof, a rod disposed within the hollow shaft one end of which is pivoted to the handle for reciprocation thereby, and means connected with the other end of the rod, operable through the said opening through the lower end of the hollow shaft, and with another valve stem to operate another valve by the reciprocated rod.

STEPHEN J. CARMODY.